Mrs. L. E. Love. Infants Head Dresses.

No. 121,391.

Patented Nov. 28, 1871.

Witnesses:
Gustave Dieterich
Wm. H. C. Smith

Inventor:
Mrs. L. E. Love,
per
Attorneys.

UNITED STATES PATENT OFFICE.

LOUISE E. LOVE, OF NEW YORK, N. Y.

IMPROVEMENT IN INFANTS' HEAD-DRESSES.

Specification forming part of Letters Patent No. 121,391, dated November 28, 1871.

*To all whom it may concern:*

Be it known that I, Mrs. LOUISE E. LOVE, of the city, county, and State of New York, have invented a new and useful Improvement in Infants' Head-Dresses; and I do hereby declare that the following is a full, clear, and exact description thereof, which will enable others skilled in the art to make and use the same, reference being had to the accompanying drawing forming part of this specification, in which—

Figure 1:
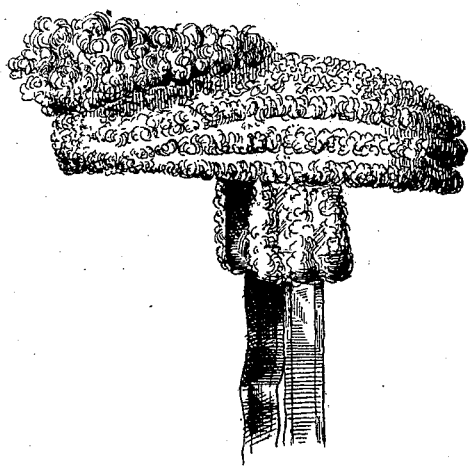
Figure 2:
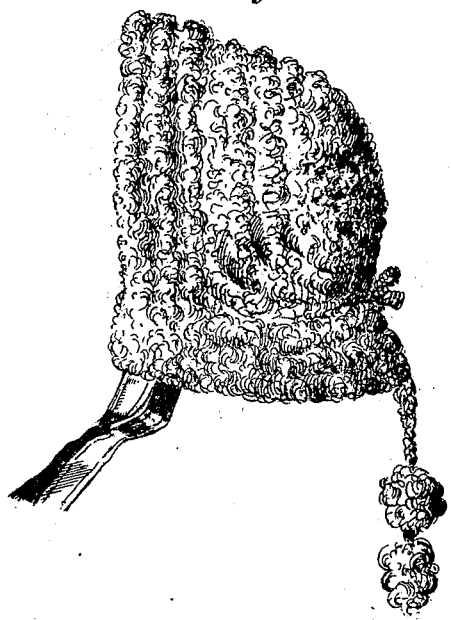

Figures 1 and 2 represent two styles of my improved infant's cap.

Similar letters of reference indicate corresponding parts.

In making infants' caps or head-dresses the first requisite is that they should be delicate and soft, so as not to chafe the tender skin of the wearer, and at the same time light, so as not to tire the weak muscles of the neck. Infants' caps have been made of lace, but this material is expensive and at the same time harsh, so as to be liable to hurt and chafe the skin, especially in the neck, where it must necessarily be gathered. Infants' caps have also been made of worsted; but caps thus made are too warm, especially for summer wear.

My invention has for its object to furnish, as an article of manufacture, infants' caps which shall be delicate, soft, light and not too warm, and which shall, at the same time, be neat and beautiful and not expensive.

In making these caps they are crocheted of silk, and may be made of different styles, as the taste of the maker may dictate. Two styles are shown in the drawing. The stitch may be varied, as may be desired.

I am aware that infants' caps have been crocheted of worsted. This I do not claim; but

What I claim as new, and desire to secure by Letters Patent, is—

An infant's cap of crocheted silk, as a new article of manufacture.

The above specification of my invention signed by me this 13th day of May, 1871.

MRS. LOUISE E. LOVE.

Witnesses:
 JAMES T. GRAHAM,
 T. B. MOSHER.    (38)